United States Patent [19]
Iwata et al.

[11] Patent Number: 5,817,441
[45] Date of Patent: Oct. 6, 1998

[54] PROCESS FOR PREPARATION OF COLOR FILTER AND LIQUID CRYSTAL DISPLAY DEVICE

[75] Inventors: Kenichi Iwata, Tokyo; Fumitaka Yoshimura; Hiroyuki Suzuki, both of Yokohama; Nagato Osano, Kawasaki; Junichi Sakamoto, Yokohama, all of Japan

[73] Assignee: Canon Kabushiki Kaisha, Tokyo, Japan

[21] Appl. No.: 907,046

[22] Filed: Aug. 6, 1997

[30] Foreign Application Priority Data

| Aug. 7, 1996 | [JP] | Japan | 8-208433 |
| Jul. 31, 1997 | [JP] | Japan | 9-206329 |

[51] Int. Cl.$^6$ ............. G02B 5/20; G02F 1/1335
[52] U.S. Cl. ............. 430/7; 430/321; 347/106; 427/164
[58] Field of Search ............. 430/7, 321; 349/106; 347/106; 427/164

[56] References Cited

U.S. PATENT DOCUMENTS 5,609,943  3/1997  DeKoven et al. ............. 430/7

FOREIGN PATENT DOCUMENTS

| 4121702 | 4/1992 | Japan . |
| 6347637 | 12/1994 | Japan . |
| 7035915 | 2/1995 | Japan . |
| 7035917 | 2/1995 | Japan . |
| 7-063911 | 3/1995 | Japan . |
| 7-248413 | 9/1995 | Japan . |
| 8-160219 | 6/1996 | Japan . |

*Primary Examiner*—John A. McPherson
*Attorney, Agent, or Firm*—Fitzpatrick, Cella, Harper & Scinto

[57] ABSTRACT

Disclosed herein is a process for producing a color filter, which comprises the steps of forming a pre-cured black matrix pattern having a water repellency on a transparent substrate, applying color inks to the portions of the substrate corresponding to the spaces of the pre-cured black matrix pattern, and complete curing the pre-cured black matrix.

24 Claims, 2 Drawing Sheets

PROCESS FOR PREPARATION OF COLOR FILTER AND LIQUID CRYSTAL DISPLAY DEVICE

BACKGROUND OF THE INVENTION

1. Field of the Invention

The present invention relates to a production process of a color filter, and particularly to a production process of a color filter making use of an ink-jet printing method.

The present invention also relates to a production process of a liquid crystal display device.

2. Related Background Art

With the advancement of personal computers, particularly, portable personal computers in recent years, the demand for liquid crystal display devices, particularly, color liquid crystal display devices increases. It is however necessary to greatly reduce the cost of the color liquid crystal display devices for further spreading them. There is a demand for reduction in the cost of color filters particularly given much weight from the viewpoint of the cost.

As a process for producing a color filter at low cost, it is proposed to form light-screening black matrices on a glass substrate and eject inks toward spaces between the black matrices using an ink-jet printer, thereby coloring portions of the substrate corresponding to the spaces. With respect to this process, materials hard to wet with inks and easy to repel the inks are investigated as materials for black matrices in order to successfully fill the inks in space areas between the black matrices, which correspond to respective pixels.

For example, Japanese Patent Application Laid-Open No. 7-35917 proposes a process in which a material for black matrices having a contact angle with inks of at least 20° is used to form black matrices, and the inks are ejected toward space areas between the black matrices. In Japanese Patent Application Laid-Open No. 7-35915, it is proposed to use a material having a contact angle with water of at least 40° as a material for black matrices. In Japanese Patent Application Laid-Open No. 6-347637, it is proposed to adjust critical surface tensions of a substrate surface, inks and a black matrix surface so as to be the substrate surface>the inks>the black matrix surface, and to preset their critical surface tensions in such a manner that the black matrix surface is lower than 35 dyn/cm, the substrate surface is not lower than 35 dyn/cm, and the inks are different by at least 5 dyn/cm from both the substrate surface and the black matrix surface. In all these examples, it is proposed to contain a fluorine compound or a silicon compound in materials for the black matrices to impart a high water repellency to the materials.

Besides, Japanese Patent Application Laid-Open No. 4-121702 proposes a process for forming banks having a solvophilicity opposite to a substrate and charging inks between banks. However, detailed description as to materials is not made.

When a fluorine compound or a silicon compound, which is a water repellent, is mixed into a material for black matrices like these examples, however, the water repellent in the material for black matrices is evaporated upon post baking, which is a final step for forming a black matrix pattern, to thinly attach to the surface of a glass substrate corresponding to the spaces between black matrices. On the other hand, even when no water repellent is added, low molecular organic substances contained in the material for black matrices are evaporated to attach to the glass surface likewise. In each case, the glass surface comes to exhibit water repellency, which causes a problem that when inks are applied to portions of the glass substrate corresponding to the spaces between black matrices, said portions being to serve as pixels, the inks are prevented from attaching thereto.

Besides, because the black matrix surface has the water-repellency, there has been another problem that a protection layer and a transparent conductive film formed on the surface become worse in adhesion after the coloration with ink.

Furthermore, there has been still another problem that the water-repellent agent in the black matrix is evaporated in the thermal process in the manufacturing process of a liquid crystal display device, which affects the liquid crystal display device badly.

SUMMARY OF THE INVENTION

The present invention has been completed in view of the foregoing circumstances and has as its object the provision of a process for producing a color filter, by which no ink cissing occurs upon applying color inks to space areas between black matrices by ink-jet or the like to evenly color them, thereby producing a color filter free of defects and irregularities and high in contrast, and of a process for producing a liquid crystal display device equipped with such a color filter.

The present invention has also as its object the provision of a process for producing not only a color filter, without using a water repellent in a black matrix, in which no ink cissing is caused and space areas between black matrices can be colored evenly when the space areas are colored, but also color filters, in which a protective layer and a transparent conductive layer are good adhesive and further no bad affect is caused on a production of a liquid crystal display device.

The above object can be achieved by the present invention described below.

According to the present invention, there is thus provided a process for producing a color filter, comprising the steps of: forming a pre-cured black matrix pattern having a water repellency on a transparent substrate; applying color inks to the portions of the substrate corresponding to the spaces of the pre-cured black matrix pattern; and complete curing the pre-cured black matrix.

According to the present invention, there is also provided a process for producing a liquid crystal display device, comprising the steps of: forming a color filter substrate via steps of forming a pre-cured black matrix pattern having a water repellency on a transparent substrate, applying color inks to the portions of the substrate corresponding to the spaces of the pre-cured black matrix pattern, and complete curing the pre-cured black matrix; arranging an opposite substrate having pixel electrodes in opposition to the color filter substrate; and enclosing a liquid crystal composition in a space between the color filter substrate and the opposite substrate.

DETAILED DESCRIPTION OF THE PREFERRED EMBODIMENTS

Figure 1A:
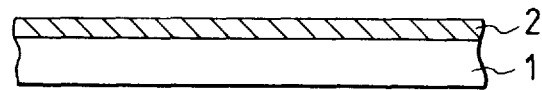
FIGS. 1A, 1B, 1C, 1D and 1E illustrate the steps of producing a color filter according to the present invention.
Figure 1B:
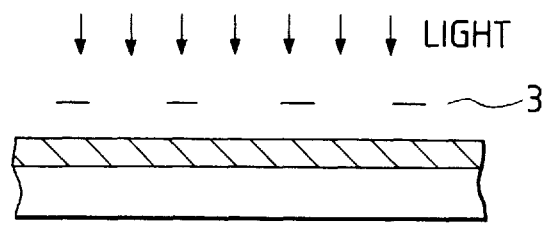
Figure 1C:
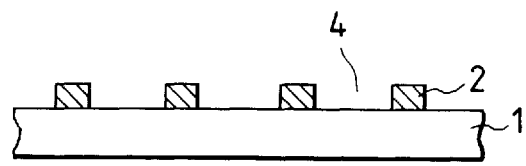
Figure 1D:
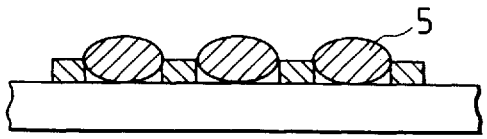
Figure 1E:
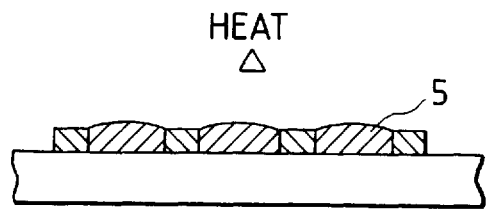

In order to prevent inks situated at adjoining pixel areas from mixing with each other beyond a black matrix when portions of a substrate corresponding to spaces between black matrices are colored with red, green and blue inks in the production of a color filter, it is necessary that the black matrices are formed with a material hard to wet, namely, they have surface energy lower than that of the inks. On the other hand, in order to fully spread inks over respective pixel areas partitioned by the black matrices to obtain a color filter good in contrast, it is necessary that the surfaces of the pixel areas are easy to wet with inks, namely, the surface energy of the pixel areas is higher than that of the inks. Accordingly, it is necessary that a certain difference of wettability to inks arises between the black matrices and the pixel areas partitioned by the black matrices. The wettability can be expressed by surface energy or contact angle with water.

As a result of intensive study, the inventors of the present invention have found that the resin component used for the black matrix is higher in water repellency at the time of pre-curing than at the time of complete curing, and then accomplished the present invention. In other words, with the present invention, since the application of color inks is performed at a state of pre-curing before a black matrix is cured completely, the water repellency is high on a pattern of the black matrix, whereas the water repellency is low in space areas partitioned by the black matrices, because neither water-repellent component nor organic component is adhered thereto. Thus, a difference in the water repellency (difference in surface energy) between the pixel portion, a space area partitioned by the black matrices and the black matrix portion can be increased. Therefore, the present invention permits application of color inks to the space areas between the black matrices to evenly color the space areas without causing any ink cissing, thereby producing a color filter free of defects and irregularities and high in contrast.

Here, the complete curing means a treatment for forming black matrices, which can be used as color filter for liquid crystal display device, by heating patterned black matrices to firmly adhere it to the substrate surface and promoting the durability by increasing the degree of polymerization. Temperature of the heat treatment is generally in a range of from about 150° to 250° C., depending on the black matrix material used.

Meanwhile, a state of pre-curing means a state that a black matrix material is adhered to the substrate surface and a part of solvents contained in the material are evaporated. However, because of not subjected to a heat treatment such as a complete curing treatment, the material does not reach a practical film strength as obtained after the complete curing.

To be more specific, the state of pre-curing signifies a state that a part of a solvent which dissolves a resin component used for a black matrix, is evaporated.

Generally, as to a solvent for dissolving a resin component, there is used a high boiling solvent for improving a levelling property of a film concurrently with a low boiling solvent as a diluent for dissolving a resin and adjusting a viscosity at the time of application to an optimum range.

The state where a part of solvent is evaporated means a state that most of the low boiling solvent evaporates.

The pre-curing state used in the present invention is expressed quantitatively with a remaining proportion of the solvent in a whole amount of the black matrix material.

Dependent on materials, the remaining proportion of the solvent is about from 5 to 20% by volume based on the total amount of the black matrix material.

In the present invention, the black matrix has only to exhibit the water repellency in the pre-curing state at the application of ink. However, use of a material that decreases a water repellency after the complete curing is preferable, because an adhesion of the protective layer or the transparent layer formed in the subsequent step is enhanced.

As to the material which forms black matrices of the present invention, it is preferable to use a material the contact angle to water of which can be kept not less than 70° after pre-curing, but the contact angle of which is decreased by 40° or more, preferably by 60° or more, by means of complete curing.

By using such the material, the black matrices can prevent color mixing surely when inks are applied, because a difference between contact angles of the black matrix and the space area partitioned by the black matrices can be made 40° or more after the pre-curing, and on the other hand, an adhesion of the protect layer and the transparent conductive layer which are formed in the subsequent step can be improved, because a contact angle of the black matrix can be made 30° or less after the complete curing.

As a material for forming the black matrices in the present invention, either a black photosensitive resin composition or a black nonphotosensitive resin composition may be used. In order to enhance a water repellency, it is preferable to use a resin having a group easy to be decomposed in a subsequent step, such as a methyl group, on its side chain. Such a material is a material for black matrices, which generally requires a heat treatment for formation of the black matrices, and is such that a water repellent, unreacted substances (for example, a photopolymerization initiator and a monomer component), a silane coupling agent added for enhancing adhesion to a substrate, an organic solvent as a solvent, and the like are evaporated from the material for black matrices during the heat treatment to enhance the water repellency of the space areas between the black matrices, thereby deteriorating their wettability to inks. However, such a material may be suitably used in the present invention.

The black photosensitive resin composition comprises a black pigment or dye and a photosensitive material and may optionally contain a nonphotosensitive resin.

The photosensitive material may be UV resists, DEEP-UV resists, ultraviolet-curing-type resins and the like.

Examples of the UV resists include negative-type resists such as cyclized polyisoprene-aromatic bisazide type resists and phenol resin-aromatic azide compound type resists, and positive-type resists such as novolak resin-diazonaphthoquinone type resists.

Examples of the DEEP-UV resists include positive-type resists, such as radiation-decomposable polymer resists such as poly(methyl methacrylate), poly(styrene sulfone), poly(hexafluorobutyl methacrylate), poly(methyl isopropenyl ketone) and brominated poly(1-trimethyl-silylpropyn), and dissolution inhibitor type positive-type resists such as o-nitrobenzyl cholates; and negative-type resists such as poly(vinylphenol-3,3'-diazide diphenyl sulfone) and poly(glycidyl methacrylate).

Examples of the ultraviolet-curing-type resins include polyester acrylates, polyepoxy acrylates and polyurethane acrylates, which contain about 2 to 10% by weight of one or more photopolymerization initiators selected from among benzophenone and substituted derivatives thereof, benzoin and substituted derivatives thereof, acetophenone and substituted derivatives thereof, and oxime-type compounds formed from benzil and the like.

Of these, a negative-type resist such as UV resists, DEEP-UV resists and a ultraviolet-curing-type resin are preferable, since a water repellency is higher at the time of pre-curing than at the time after complete curing, namely a water repellency decreases after the complete curing.

The black photosensitive resin composition is dispersed in a solvent composed of a high boiling solvent and a low boiling solvent mentioned above when it is applied to a substrate.

Examples of the low boiling solvents include butyl acetate, propylene glycol monomethyl ether (PGME) and the like, and examples of the high boiling solvents include propylene glycol monomethyl ether acetate (PGMEA), ethyl cellosolve acetate (ECA), 3-methoxybutyl acetate (MBA) and the like.

There is used a mixed solvent in which the high boiling solvent is contained in a proportion of at least 50% by weight.

Carbon black or a black organic pigment may be used as a black pigment.

A water repellent may be contained in the black matrices to enhance the water repellency thereof. However, it is preferable not to add such the water repellent, since a water repellency at the time of pre-curing is high and a protective layer and a transparent conductive layer can be easily formed in the present invention.

In the case where such a black photosensitive resin composition is used, a color filter may be produced, for example, in accordance with such a series of steps as illustrated in FIGS. 1A to 1E. Incidentally, FIGS. 1A to 1E correspond to the following steps (a) to (e), respectively.

(a) A black photosensitive resin composition 2 is applied to a transparent substrate 1. As a coating method, various methods such as spin coating, die coating and dip coating may be used. The thickness of the coating film is a thickness sufficient to obtain necessary light-screening ability and is, for example, about 1 $\mu$m. As the transparent substrate, for example, glass is often used. However, a plastic film or sheet may be used. As needed, a thin film for enhancing adhesion may be formed in advance on the transparent substrate to enhance the adhesion of the transparent substrate to black matrices and color inks.

(b) The coated layer 2 is precured using, for example, a hot plate, and exposed using an exposure system, which emits light of a wavelength corresponding to the sensitivity of the photosensitive resin composition, and a mask 3 having a predetermined pattern.

(c) When the photosensitive resin composition is of a negative-type, portions, which have been screened by a mask 3 upon the exposure, are dissolved out in a developing solution by development to bare the surface of the substrate, and the exposed portions are left as a black matrix pattern 2. Subsequently, the thus-developed coating film is rinsed to wash out the developing solution, and simply dried by means of spin drying, air knife or the like. Thus, the substrate surface 4 of the space areas between the black matrices turns to be clean.

(d) Inks 5 of predetermined colors, for example R (red), G (green) and B (blue), are applied to the space areas 4 between the black matrices. As a method of applying the inks, there may be used a commonly used printing method such as offset printing, gravure printing or screen printing. However, it is particularly preferable to use ink-jet printing using an ink-jet printer in that since no printing plate is used upon printing, high-precision patterning can be performed by controlling the diameter of an ink droplet. As inks used herein, inks easy to be repelled by the black matrices mentioned above and easy to wet pixel areas situated between the black matrices may be suitably chosen for use. The surface energy (surface tension) of the inks is generally within a range of from 30 to 70 dyn/cm. Such inks may be either dye-based inks or pigment-based inks. The solvent for the inks is composed mainly of water and may contain a hydrophilic organic solvent and the like.

It is preferable to use thermosetting-type inks as the inks because it is possible to carry out curing of ink and complete curing of the black matrices at the same step.

A material settable under the same temperature conditions as in the complete curing of the black matrices is preferred as a thermosetting component contained in the inks. It may be suitably chosen for use from among acrylic resins, epoxy resins, phenol resins, enethiol and the like. Besides, those obtained by introducing an aromatic amine, an acid anhydride or the like into the above resins may also be used according to the process temperature required.

(e) A heating-drying (post baking) treatment for curing a black matrices completely is performed to form a the black matrices. At the same time, it is preferable o carry out complete curing the inks.

Thereafter, a protective layer is provided, as needed.

On the other hand, a nonphotosensitive resin composition containing a black pigment or dye and a nonphotosensitive resin may also be used as the material for forming the black matrices. The black nonphotosensitive resin composition is dispersed in a suitable solvent when it is applied to the substrate.

Examples of the nonphotosensitive resin used include polyimide, acrylic monomers and urethane acrylates.

In the production steps of a color filter in this case, a black matrix pattern can be formed by forming a coated film of the black nonphotosensitive resin composition in a thickness of about 1 $\mu$m on the substrate in the same manner as in the case where the photosensitive resin composition is used, and thereafter using the photoresist as a mask and etching the material for the black matrices. The pattern may also be formed by lift-off using a photoresist. Thereafter, the color filter can be produced in accordance with the above-described step (d) and subsequent steps.

Figure 2:
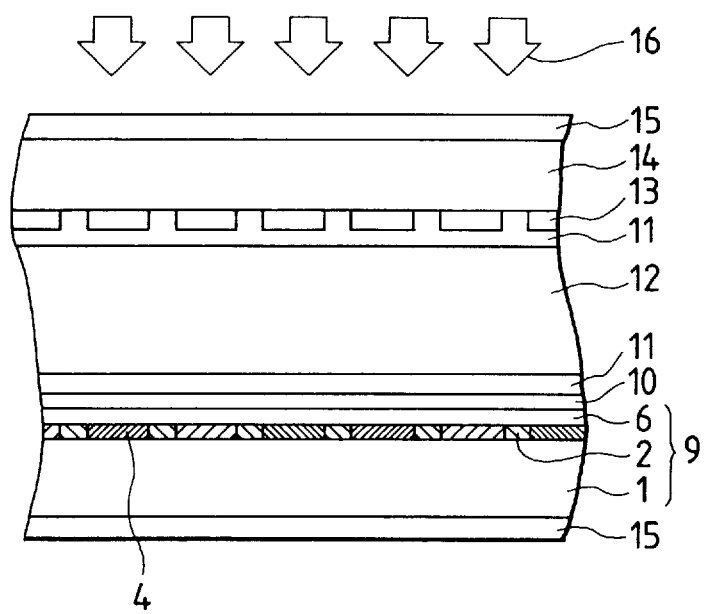
FIG. 2 is a cross-sectional view illustrating the construction of a liquid crystal display device.

FIG. 2 illustrates a cross section of a TFT color liquid crystal display device in which the color filter according to the present invention has been incorporated. Incidentally, the construction thereof is not limited to this embodiment.

The color liquid crystal display device is generally formed by uniting a color filter substrate 1 and a substrate 14 opposite thereto and enclosing a liquid crystal composition 12 in a space between them. TFT (not illustrated) and transparent pixel electrodes 13 are formed in the form of a matrix inside one substrate 14 of the liquid crystal display device. A color filter 9 is provided at a position opposite to the pixel electrodes 13 inside the other substrate 1 so as to arrange coloring materials of R, G and B. A transparent counter electrode (common electrode) 10 is formed over on the color filter 9. Black matrices are generally formed on the side of the color filter substrate. Alignment films 11 are further formed within the surfaces of both substrates. Liquid crystal molecules can be aligned in a fixed direction by subjecting these films to a rubbing treatment. Polarizing plates 15 are bonded to the outer surfaces of both glass substrates. The liquid crystal composition 12 is charged in a space (about 2 to 5 $\mu$m) between these glass substrates. As a back light 16, a combination of a fluorescent lamp and a scattering plate (both, not shown) is generally used. The liquid crystal composition functions as a shutter for changing the transmittance of rays from the back light 16, thereby making a display. Incidentally, reference numerals 2, 4 and 6 designate black matrices, colored portions and a protective film, respectively.

The present invention will hereinafter be described in more detail by the following Examples.

EXAMPLE 1

After a glass substrate was subjected to alkali ultrasonic cleaning using a 2% sodium hydroxide aqueous solution and then to a UV-ozone treatment, a resist material (a negative-type resist ink for black matrices, V-259 BK-739P, trade name, product of Nippon Steel Chemical Co., Ltd.) comprising carbon black was applied to the glass substrate by a spin coater so as to give a film thickness of 1 μm. This substrate was heated at 80° C. for 180 seconds on a hot plate to pre-cure the resist.

The resist film thus formed was subjected to proximity exposure by means of a DEEP-UV exposure system and a mask having a predetermined pattern and then developed with a developing solution composed of an aqueous solution of an inorganic alkali using a spin developer. The thus-developed resist film was further rinsed with purified water to completely remove the developing solution, and the substrate is simply dried using a spin dryer.

In this state, the contact angle of the black matrix surface with water was measured. As a result, it was found that the contact angle was 85°, and the surface hence become a state hard to wet. On the other hand, the contact angle of the glass surface at spaces between the black matrices with water was 45°.

Dye-based inks of red, green and blue colors were each applied to the space areas of the black matrix pattern using an ink-jet apparatus to color portions of the substrate surface corresponding to the space areas. These inks were each prepared by dispersing a dye (suitably selected from among, for example, anthraquinone dyes, azo dyes, triphenylmethane dyes and polymethine dyes) in a resin (self-crosslinking thermosetting resin composed mainly of acrylic-silicone graft polymer), and dissolving this dispersion in a solvent (for example, isopropyl alcohol, ethylene glycol or N-methyl-2-pyrrolidone). The inks had surface energy of 48 dyn/cm.

Thereafter, the black matrices and color inks are heated at 200° C. for 30 minutes in a clean oven to completely cure them, thereby completing a color filter.

Upon inspecting the color filter, the color inks evenly covered the substrate surface at the space areas between the black matrices, and defective results such as bleeding, runout, color mixing between adjoining pixel areas and blank areas were not observed. Thereafter, a protective film was formed on surfaces of the black matrices and color inks, afterward, a transparent conductive film was formed on above-mentioned (protective) film, using an overcoating material (Optomer SS 6500, trade name, a product of Nippon Synthetic Rubber Co., Ltd.). In this case, the protective film was excellent in adhesion, and so no inconvenience arose. The color filter thus produced was used to fabricate a liquid crystal display device illustrated in FIG. 2. As a result, a liquid crystal display device free of any defect and excellent in color properties was provided.

EXAMPLE 2

After a glass substrate was subjected to an alkali ultrasonic cleaning treatment using a 2% sodium hydroxide aqueous solution and then to a UV-ozone treatment, a resist material (a negative-type resist ink for black matrices, Color Mosaic CK-S171, trade name, product of Fuji Hunt K. K.) comprising carbon black was applied to the glass substrate by a spin coater so as to give a film thickness of 1 μm. This substrate was heated at 100° C. for 180 seconds on a hot plate to precure the resist.

The resist film thus formed was subjected to proximity exposure by means of an i-ray exposure system and a mask having a predetermined pattern and then developed by dipping it in a developing solution composed of an aqueous solution of an inorganic alkali. Thereafter, the pattern was regulated into a complete form while spraying purified water under high pressure to conduct a rinsing treatment. After the substrate is simply dried using a spin dryer, in this state, the contact angle of the black matrix surface with water was measured. As a result, it was found that the contact angle was 870°, and the surface hence become a state hard to wet. On the other hand, the contact angle of the glass surface at spaces between the black matrices with water was 22°.

Dye-based inks of red, green and blue colors were each applied to the space areas of the black matrix pattern using an ink-jet apparatus to color portions of the substrate surface corresponding to the space areas. These inks were each prepared by dispersing a dye (suitably selected from among, for example, anthraquinone dyes, azo dyes, triphenylmethane dyes and polymethine dyes) in a resin (self-crosslinking acrylic acid-acrylic ester emulsion), and dissolving this dispersion in a solvent (for example, isopropyl alcohol, ethylene glycol or N-methyl-2-pyrrolidone). The inks had surface energy of 48 dyn/cm.

Thereafter, the black matrices and color inks are heated at 200° C. for 30 minutes in a clean oven to completely cure them, thereby completing a color filter.

Upon inspecting the color filter, the color inks evenly covered the substrate surface at the space areas between the black matrices, and defective results such as bleeding, runout, color mixing between adjoining pixel areas and blank areas were not observed.

Thereafter, a protective film was formed on surfaces of the black matrices and color inks, afterward, a transparent conductive film was formed on above-mentioned (protective) film, using an overcoating material (Optomer SS 6500, trade name, a product of Nippon Synthetic Rubber Co., Ltd.). In this case, the protective film was excellent in adhesion, and so no inconvenience arose. The color filter thus produced was used to fabricate a liquid crystal display device illustrated in FIG. 2. As a result, a liquid crystal display device free of any defect and excellent in color properties was provided.

Comparative Example 1

After the pattern formation of a black matrix on the glass substrate by a series of steps of coating, exposure, development and rinsing as similar to Example 1, the resultant substrate was successively heated at 200° C. for 30 minutes in a clean oven to perform complete curing of the black matrices, before the application of color inks.

In this state, the contact angles of the black matrix surface and the glass surface at the space areas between the black matrices with water were 75° and 68°, respectively, and so a water repellency of the glass surface at the space areas between black matrices was made high and a difference in surface energy between both surfaces was made little.

It was attempted to color the surface of this substrate corresponding to the space areas between the black matrices with the same dye-based inks as those used in Example 1 by means of an ink-jet apparatus. However, the inks were repelled at the glass surface corresponding to the space areas, and so the inks could not sufficiently wet the glass surface, nor spread over the pixel areas.

Comparative Example 2

Completely cured black matrices are formed on a glass substrate in the same manner as in Comparative Example 1 above, using a material obtained by adding 1% by weight of a fluorine compound water repellent (Flolard FC430, trade name, Sumitomo 3M Limited) to a resist material (a negative-type resist ink for black matrices, V-259 BK-739P, trade name, product of Nippon Steel Chemical Co., Ltd.) as a material for black matrices.

In this state, the contact angle of the black matrix surface with water was measured. As a result, it was found that the contact angle was 88°, and the surface hence become a state hard to wet. However, the glass surface also became a state hard to wet like the black matrix surface as demonstrated by its contact angle with water of 78°.

It was attempted to apply the same dye-based inks of red, green and blue colors as those used in Example 1 to the space areas between the black matrices by means of an ink-jet apparatus. However, the inks spread over the whole surface, so that the inks could not be filled in only the pixel areas.

Comparative Example 3

Completely cured black matrices are formed on a glass substrate in the same manner as in Comparative Example 1 above, using a material obtained by adding 0.5% by weight of a fluorine compound water repellent (Flolard FC430, trade name, Sumitomo 3M Limited) to a resist material (a negative-type resist ink for black matrices, V-259 BK-739P, trade name, product of Nippon Steel Chemical Co., Ltd.) as a material for black matrices.

In this state, the contact angle of the black matrix surface with water was measured. As a result, it was found that the contact angle was 80°, and the surface hence become a state hard to wet. The contact angle of the glass surface with water was 74°.

The surface of the substrate corresponding to the space areas between the black matrices was colored with the dye-based inks of red, green and blue colors by means of an ink-jet apparatus. As a result, it was observed that the inks were partially repelled at the glass surface corresponding to the space areas.

It was attempted to apply an overcoating material (Optomer SS 6500, trade name, a product of Nippon Synthetic Rubber Co., Ltd.) by spin coating for forming a protective layer on the surface, after drying the substrate applied with inks at 50° C. for 10 minutes. However, the protective layer on the black matrices was broken within several minutes after heat curing began.

According to the present invention, color filters free of defects, irregularities and color mixing and high in contrast can be easily produced with ease without causing any ink cissing upon applying color inks to space areas between black matrices by ink-jet or the like to evenly color the space areas.

In addition, according to the present invention, without using a water repellent in a black matrix, it is possible to produce not only color filters, in which no ink cissing is caused and space areas between black matrices can be colored evenly when the space areas are colored, but also color filters, in which a protective layer and a transparent conductive layer are good adhesive and further no bad affect is caused on a production of a liquid crystal display device.

Still further, according to the present invention, the complete curing of a black matrix and the effectuation of color inks can be fulfilled at the same time and accordingly the manufacturing process can be shortened, thus enabling a high-quality color filter to be manufactured inexpensively.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A process for producing a color filter, comprising the steps of:
    forming a pre-cured black matrix pattern having a water repellency on a transparent substrate;
    applying color inks to the portions of the substrate corresponding to the spaces of the pre-cured black matrix pattern; and
    complete curing the pre-cured black matrix.

2. The process according to claim 1, wherein the black matrix-forming material has a water repellency after the pre-curing and the water repellency decreases after the complete curing.

3. The process according to claim 1, wherein the black matrix material is a black photosensitive resin composition.

4. The process according to claim 1, wherein the black matrix material is a black nonphotosensitive resin composition.

5. The process according to claim 1, wherein the step of forming the black matrix pattern is a step of exposing and patterning a black photosensitive resin composition.

6. The process according to claim 1, wherein the step of forming the black matrix pattern is a step of patterning a black nonphotosensitive resin composition using a photoresist.

7. The process according to claim 1, wherein the inks are applied by an ink-jet printing system.

8. The process according to claim 1, wherein the color inks are thermosetting inks.

9. The process according to claim 1, wherein the the contact angle of the pre-cured black matrix to water is at least 70°.

10. The process according to claim 1, wherein the the difference in contact angle to water between the pre-cured black matrix and the portions of the substrate corresponding to the spaces of the pre-cured black matrix pattern is at least 40°.

11. The process according to claim 1, wherein the the contact angle of the completely cured black matrix to water is not more than 30°.

12. The process according to claim 1, further comprising the step of providing a protective film on the surface of said color filter after the complete curing of the black matrix.

13. A process for producing a liquid crystal display device, comprising the steps of:
    forming a color filter substrate via a steps of forming a pre-cured black matrix pattern having a water repellency on a transparent substrate, applying color inks to the portions of the substrate corresponding to the spaces of the pre-cured black matrix pattern, and complete curing the pre-cured black matrix;

arranging an opposite substrate having pixel electrodes in opposition to the color filter substrate; and enclosing a liquid crystal composition in a space between the color filter substrate and the opposite substrate.

14. The process according to claim 13, wherein the black matrix-forming material has a water repellency after the pre-curing and the water repellency decreases after the complete curing.

15. The process according to claim 13, wherein the black matrix material is a black photosensitive resin composition.

16. The process according to claim 13, wherein the black matrix material is a black nonphotosensitive resin composition.

17. The process according to claim 13 wherein the step of forming the black matrix pattern is a step of exposing and patterning a black photosensitive resin composition.

18. The process according to claim 13, wherein the step of forming the black matrix pattern is a step of patterning a black nonphotosensitive resin composition using a photoresist.

19. The process according to claim 13, wherein the inks are applied by an ink-jet printing system.

20. The process according to claim 13, wherein the color inks are thermosetting inks.

21. The process according to claim 13, wherein the the contact angle of the pre-cured black matrix to water is at least 70°.

22. The process according to claim 13, wherein the the difference in contact angle to water between the pre-cured black matrix and the portions of the substrate corresponding to the spaces of the pre-cured black matrix pattern is at least 40°.

23. The process according to claim 13, wherein the the contact angle of the completely cured black matrix to water is not more than 30°.

24. The process according to claim 13, further comprising the step of providing a protective film on the surface of said color filter after the complete curing of the black matrix.

* * * * *

UNITED STATES PATENT AND TRADEMARK OFFICE
CERTIFICATE OF CORRECTION

PATENT NO. : 5,817,441

DATED : October 6, 1998

INVENTOR(S): KENICHI IWATA, ET AL.

It is certified that error appears in the above-identified patent and that said Letters Patent is hereby corrected as shown below:

ON COVER PAGE AT [56], REFERENCES CITED, FOREIGN PATENT DOCUMENTS

"6347637   12/1994   Japan" should
  --6-347637   12/1994   Japan--;
"4121702   4/1992   Japan" should read
  --4-121702   4/1992   Japan--;
"7035915   2/1992   Japan" should read
  --7-035915   2/1995   Japan--; and
"7035917   2/1992 Japan should read
  --7-035917   2/1992   Japan--.

COLUMN 1

Line 59, "post" should read --post---.

COLUMN 3

Line 44, "not" should read --not having been--;
Line 62, "Dependent" should read --Depending--.

COLUMN 4

Line 11, "the" (first occurrence) --should be deleted and "can" should read --can surely--;
Line 12, "surely" should be deleted.

UNITED STATES PATENT AND TRADEMARK OFFICE
CERTIFICATE OF CORRECTION

PATENT NO. : 5,817,441

DATED : October 6, 1998

INVENTOR(S): KENICHI IWATA, ET AL.

It is certified that error appears in the above-identified patent and that said Letters Patent is hereby corrected as shown below:

COLUMN 5

Line 21, "the" should be deleted.

COLUMN 6

Line 21, "(post baking)" should read --(post-baking)--;
Line 22, "a" should be deleted;
Line 24, "curing" should read --curing of--.

COLUMN 7

Line 29, "become" should read --became--.

COLUMN 8

Line 18, "870°, should read --87°,--; and
"become" should read --became--.

UNITED STATES PATENT AND TRADEMARK OFFICE
CERTIFICATE OF CORRECTION

PATENT NO. : 5,817,441

DATED : October 6, 1998

INVENTOR(S): KENICHI IWATA, ET AL.

It is certified that error appears in the above-identified patent and that said Letters Patent is hereby corrected as shown below:

COLUMN 10

Line 3, "adhesive" should read --adhesives--;
Line 11, "is" should read --are--;
Line 66, "via a" should read --comprising the--.

COLUMN 11

Line 16, "claim 13" should read --claim 13,--.

COLUMN 12

Line 6, "the" (first occurrence) should be deleted.

Line 9, "the" (third occurrence) should be deleted.

Line 14, the" (third occurrence) should be deleted.

Signed and Sealed this

Thirtieth Day of May, 2000

Attest:

Q. TODD DICKINSON

*Attesting Officer*          *Director of Patents and Trademarks*